(12) United States Patent
Tseng

(10) Patent No.: US 8,261,887 B2
(45) Date of Patent: Sep. 11, 2012

(54) SAFE BRAKING APPARATUS

(76) Inventor: Wen-Chih Tseng, Hsinchu (TW)

( * ) Notice: Subject to any disclaimer, the term of this patent is extended or adjusted under 35 U.S.C. 154(b) by 219 days.

(21) Appl. No.: 12/720,666

(22) Filed: Mar. 9, 2010

(65) Prior Publication Data

US 2010/0230214 A1 Sep. 16, 2010

Related U.S. Application Data

(60) Provisional application No. 61/232,430, filed on Aug. 8, 2009.

(30) Foreign Application Priority Data

Mar. 10, 2009 (TW) .............................. 98203603 U (51) Int. Cl.
*B62L 3/00* (2006.01)

(52) U.S. Cl. ................ 188/24.22; 188/24.12; 188/24.15; 188/24.16; 188/2 D; 188/204 R (58) Field of Classification Search ............... 188/24.12, 188/24.15, 24.16, 24.22, 2 D, 204 R; 280/264, 280/304.1
See application file for complete search history.

(56) References Cited

U.S. PATENT DOCUMENTS

| | | | |
|---|---|---|---|
| 3,942,609 A | 3/1976 | Hill | |
| 4,057,127 A | 11/1977 | Woodring | |
| 4,480,720 A | 11/1984 | Shimano | |
| 4,524,632 A | 6/1985 | Ballard | |
| 4,773,509 A | 9/1988 | Sato | |
| 4,773,510 A | 9/1988 | Sato | |
| 4,811,620 A * | 3/1989 | Old et al. ..................... 74/471 R |
| 5,540,304 A | 7/1996 | Hawkins et al. | |
| 5,732,601 A | 3/1998 | Wu | |
| 5,829,314 A | 11/1998 | Scura | |
| 5,878,626 A | 3/1999 | Gutierrez | |
| 5,927,442 A * | 7/1999 | Liao ........................... 188/24.16 |
| 6,098,486 A | 8/2000 | Liao | |
| 6,186,282 B1 | 2/2001 | Juan | |
| 6,311,805 B1 | 11/2001 | Juan | |
| 6,523,649 B1 * | 2/2003 | Juan ........................... 188/24.16 |
| 7,104,155 B2 | 9/2006 | Nilsson | |
| 7,121,386 B1 | 10/2006 | Eineke | |
| 2003/0140724 A1 * | 7/2003 | Lee et al. ..................... 74/501.6 |

* cited by examiner

*Primary Examiner* — Bradley King
*Assistant Examiner* — Mahbubur Rashid (57) ABSTRACT

A safe braking apparatus using in a two-wheel vehicle includes a left brake unit that drives the real brake unit and the front brake unit simultaneously, a right brake unit that drives the real brake unit and the front brake unit simultaneously, a front brake unit that actuates a front-wheel brake of said two-wheel vehicles, and a real brake unit that actuates a real-wheel brake of said two-wheel vehicles. Wherein, the front brake unit always works less than the real brake unit in movement.

14 Claims, 14 Drawing Sheets

SAFE BRAKING APPARATUS

CROSS-REFERENCE TO RELATED APPLICATION

This application claims the priority benefit of Taiwan application serial no. 098203603, filed on Mar. 10, 2009, and U.S. provisional application Ser. No. 61232430, filed on Aug. 8, 2009. The entirety of the above-mentioned patent applications is incorporated herein by reference and made a part of this specification.

BACKGROUND

1. Technical Field

The present invention relates to a braking apparatus, particularly to improve a braking system of two-wheel traffic tools such as a bike or motorcycle.

2. Description of the Related Art

Most conventional braking systems for motorcycles or bicycles have two independent brakes devices for the front wheel and the rear wheel, those are driven by two independent cables and operated by a left lever and a right lever on one handlebar. This arrangement enables a user to slow down or stop the traffic tool by breaking only the front wheel, only the rear wheel, or the both wheels.

Any skilled user knows that, if he want to slow down or stop such a vehicle, it is better for him to break the rear wheel first, and then break the front wheel latter. In this case, the vesicle will be under good control. However, when the driver is a new user or when something happens accidentally, coupled with the high speed of the vehicle, the user may suffer from a roll-over accident if he applies the break on the front wheel first. It is because that when the front wheel is block independently and the rear wheel is still rolling, the vesicle will be out of control and possible start to skid or even fall over. Therefore to design a more reliable braking system is very important for the safety.

For this issue, people design many kinds of synchronous or balanced brake systems. The user can control the braking devices of front and rear wheels simultaneously and synchronously by one or two brake levers to slow down or stop the front and rear wheels at the same time. Those devices may avoid the problems mentioned above. However, those so called synchronous or balanced brake systems can not achieve the effectiveness of the brakes. Within some braking device, when the user uses only one hand will not make enough movement of the brake cable to produce a sufficient brake force. It is necessary for the driver to use both hands at the same time to stop the vehicle. Some braking device can slow down or stop the vesicle by one hand, but the hand should burden the work of two hands in the conventional braking system. If the grip force of the user is not so sufficient, it will be difficult for him to stop the vesicle.

BRIEF SUMMARY

The main object of the present invention is to provide a safe braking apparatus for two-wheel vehicles, such as bicycle and motorcycle. The system is inclusive of a front brake, a rear brake, a left hand brake lever and a right hand brake lever. Regardless of whether the left or right hand brake lever is actuated firstly, or both hand brake levers are actuated simultaneously, the rear break is preferentially actuated such as the rear brake is never applied later than the front brake.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

For the shortcomings of earlier apparatus, we need to invent a safer braking apparatus. The main object is that, regardless of using his left hand or right hand brake first, as long as the driver uses any one hand to apply the braking apparatus, the apparatus will be able to provide adequate rear brakes first. If the driver applied the brake with one hand first, and then applies the brake with his another hand, the apparatus will be able to provide additional front-wheel brake after the rear wheel has been braked. The purpose to apply brake on the rear-wheel first and then the front-wheel second at any time will be reached. If the driver uses both hands at the same time, the braking apparatus can still provide a reliable result that braking the rear-wheel first or braking two wheels simultaneously. Therefore, the present invention can be described as a safe braking apparatus.

The safe braking apparatus of the present invention in a first embodiment mainly comprises: a left brake unit, a right brake unit, a front brake unit and a rear brake unit. The left brake cable of left brake unit can drive the rear and front brake units simultaneously. And the right brake cable of right brake unit can drive the rear and the front brake units simultaneously, too. However, because rear 1 brake unit conduct the force directly, and the front brake unit conduct it through a pulley or a gear. When only one hand is used or when uneven force of both hands is applied, the extent of movement of the rear brake cable is always greater than the front brake so that front wheel will not be slowed down or stopped first. The vesicle will not easily get out of control.

Figure 1:
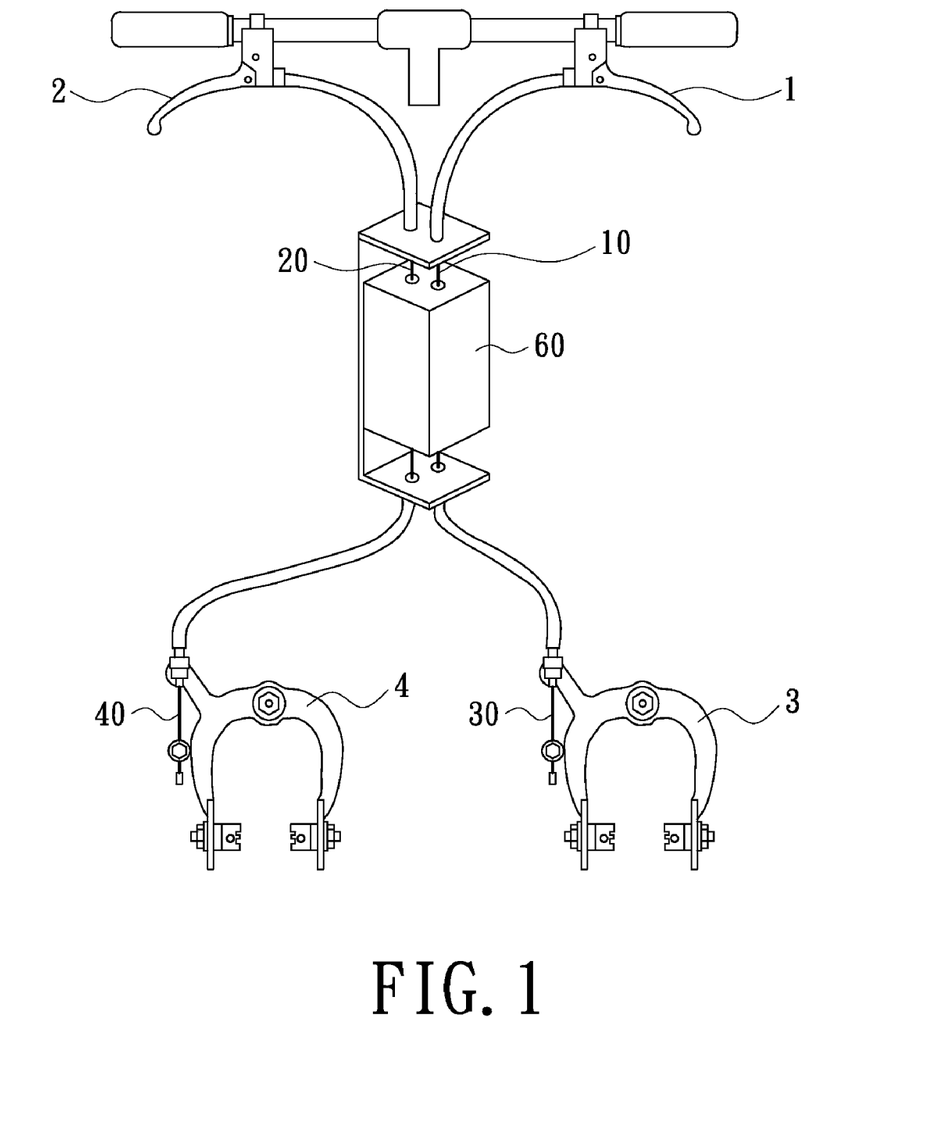
FIG. 1 is a schematic illustration of the safe braking apparatus of the present invention.

As shown in FIG. 1, the safe braking apparatus of the present invention is assembled on a bicycle having a front brake 3, a rear brake 4, a left lever 1 with a left brake cable 10, and a right lever 2 with a right brake cable 20.

Figure 2:
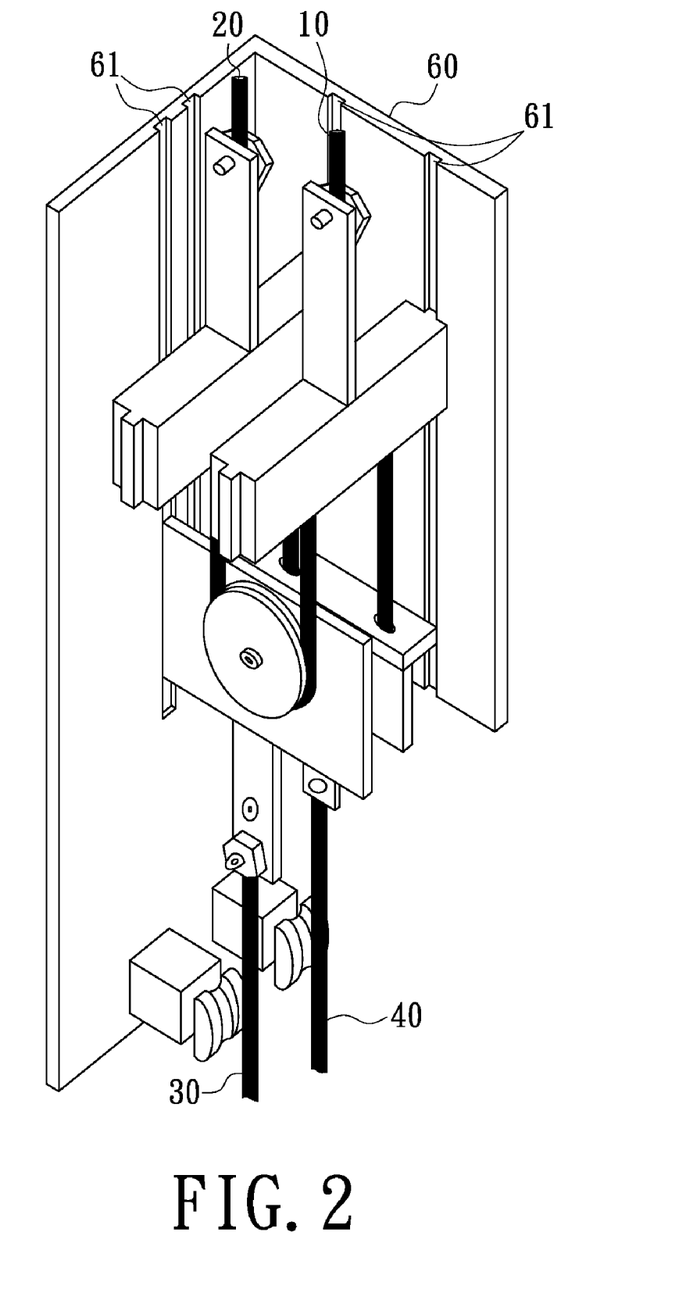
FIG. 2 is a partial cutaway view of the safe braking apparatus of the present invention in the first embodiment.
Figure 3A:
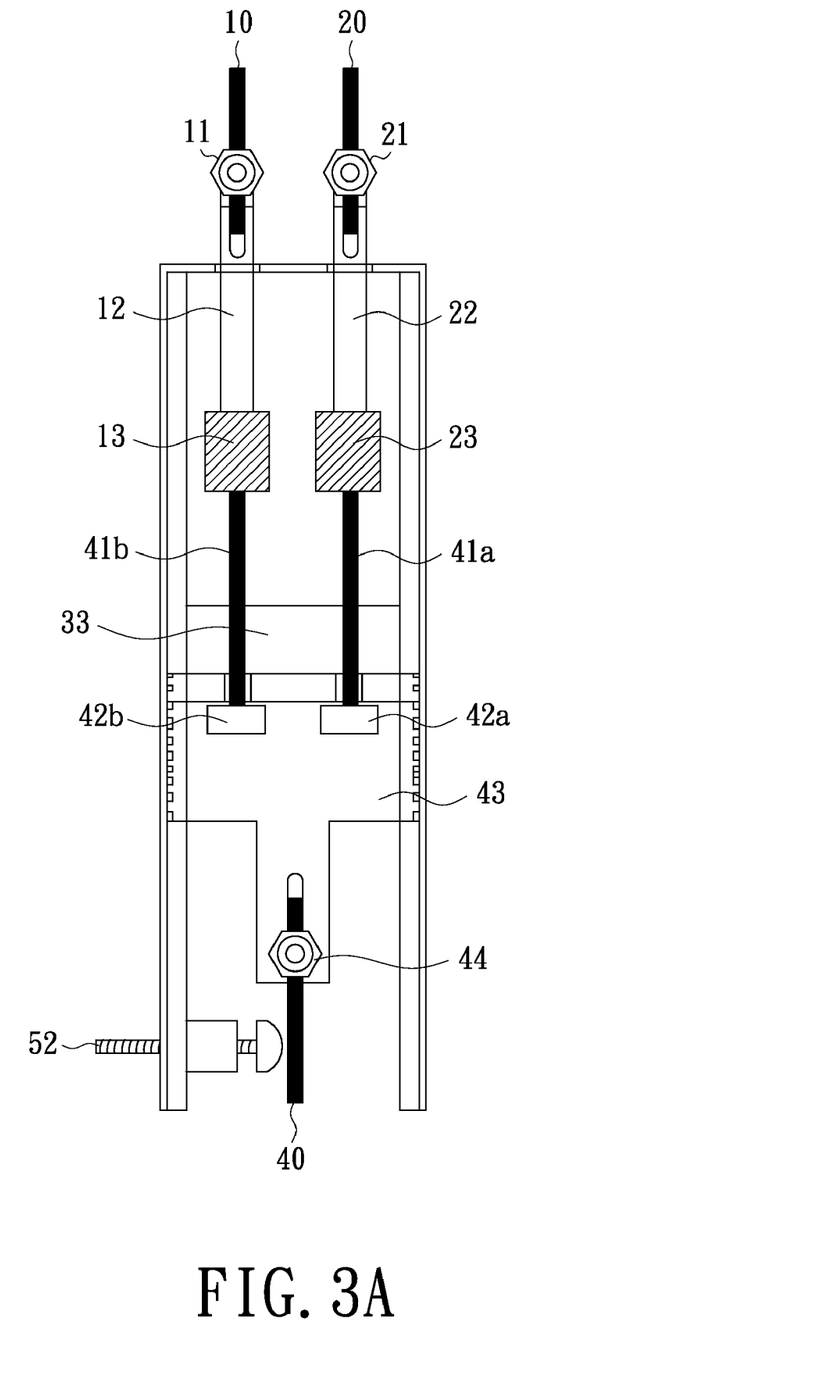
FIGS. 3A~3C are sectional views of the safe braking apparatus of the present invention in the first embodiment at resting stage, in which 3A is a front view, 3B is a side view, and 3C is a back view.
Figure 3B:
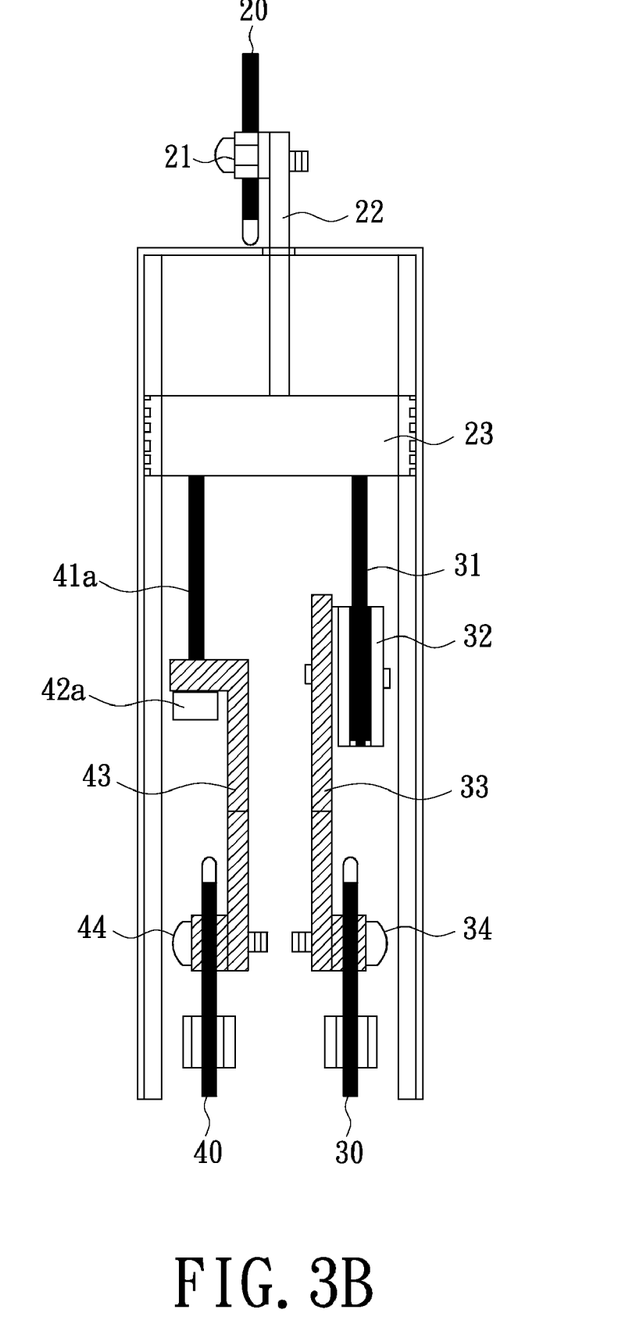
Figure 3C:
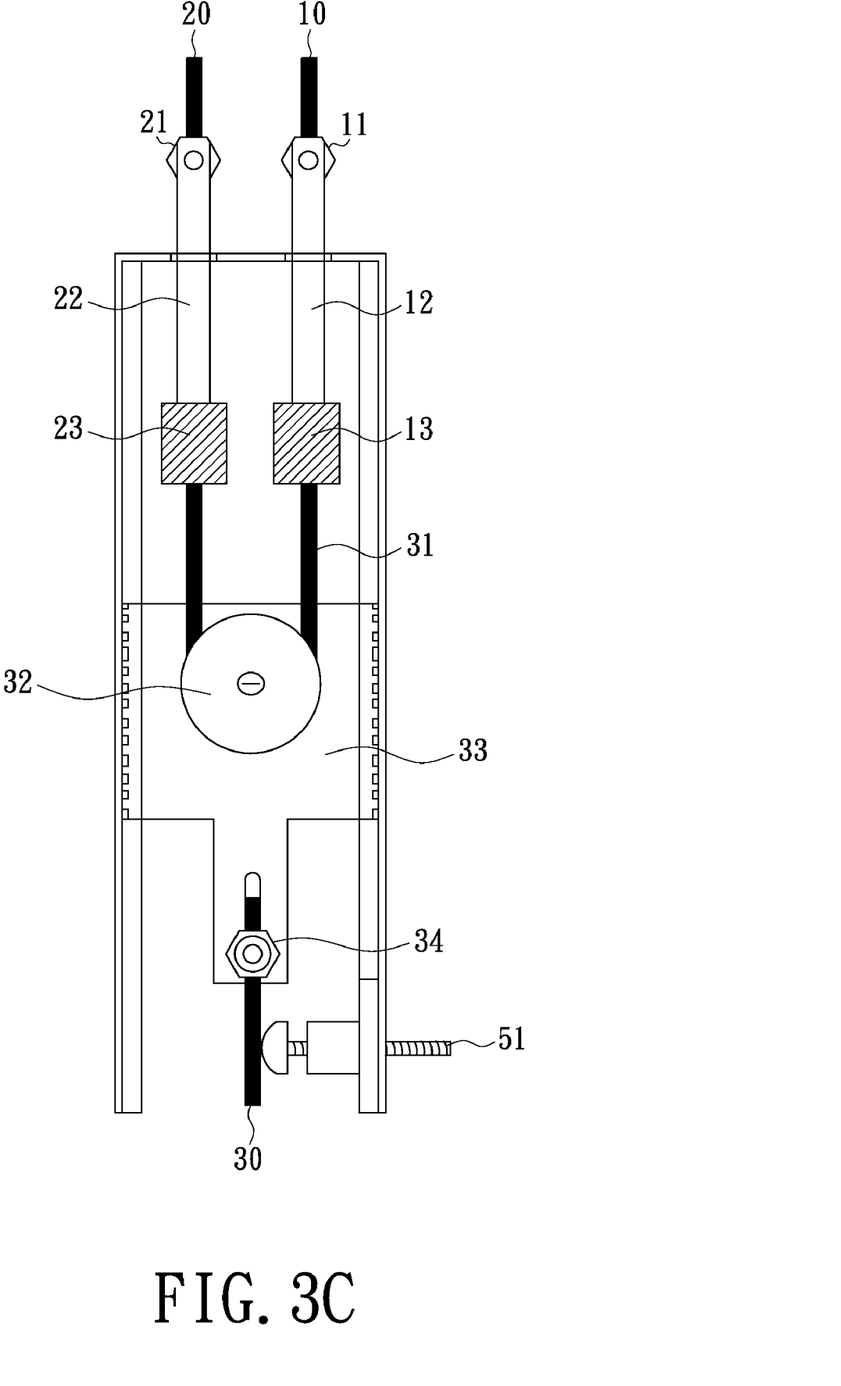

The details of the brake device in a first embodiment are shown in FIG. 2 and FIG. 3A~3C. Referring to FIG. 2, the left brake cable 10 is fixed on the left brake rod 12 by left brake cable screw 11. The left brake rod 12 is connected to the left brake bar 13 and drives the left brake bar 13 sliding movement over the tracks 61 on the shell of brake device 60. The right brake cable 20 is fixed on the right brake rod 22 by right brake cable screw 21. The right brake rod 22 is connected to the right brake bar 23 and drives the right brake bar 13 sliding movement over the tracks 61 on the shell of brake device 60. The left brake bar 13 is connected to the front brake chain 31 and the rear brake line 41*b*. The right brake bar 23 is connected to the front brake chain 31 and the rear brake line 41*a*. The front brake chain 31 is set on the front brake chain pulley 32 that is fixed on the front brake link tablet 33, and drives the front brake link tablet 33 sliding movement over the track 61. The front brake cable 30 is fixed on the front brake link tablet 33 by the front brake cable screw 34. When the front brake link tablet 33 moves by the tracks 61, it can drive front brake 3 through the front brake cable 30. The rear brake line 41*a* is connected to the rear brake knot 42*a* through the rear brake link tablet 43. The rear brake line 41*b* is connected to the rear brake knot 42*b* through the rear brake link tablet 43. The rear brake knot 42*a* or another rear brake knot 42*b* can drive the rear brake link tablet 43 sliding movement by the tracks 61. The rear brake cable 40 is fixed on the rear brake link tablet 43 by the rear brake cable screw 44. When the rear brake link tablet 43 moves by the tracks 61, it can drive rear brake 4 through the rear brake cable 40.

Figure 4A:
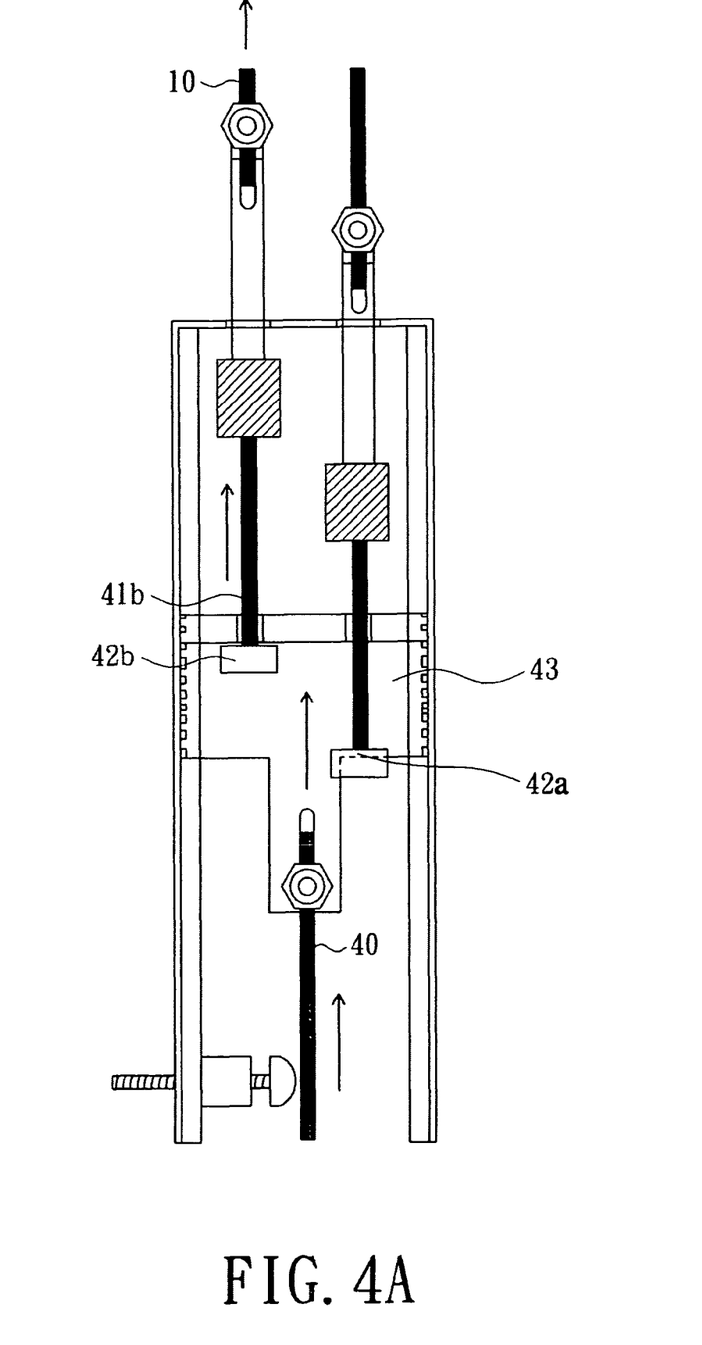
FIGS. 4A~4C are sectional views of the safe braking apparatus of the present invention in the first embodiment at left hand used stage, in which 4A is a front view, 4B is a side view, and 4C is a back view.
Figure 4B:
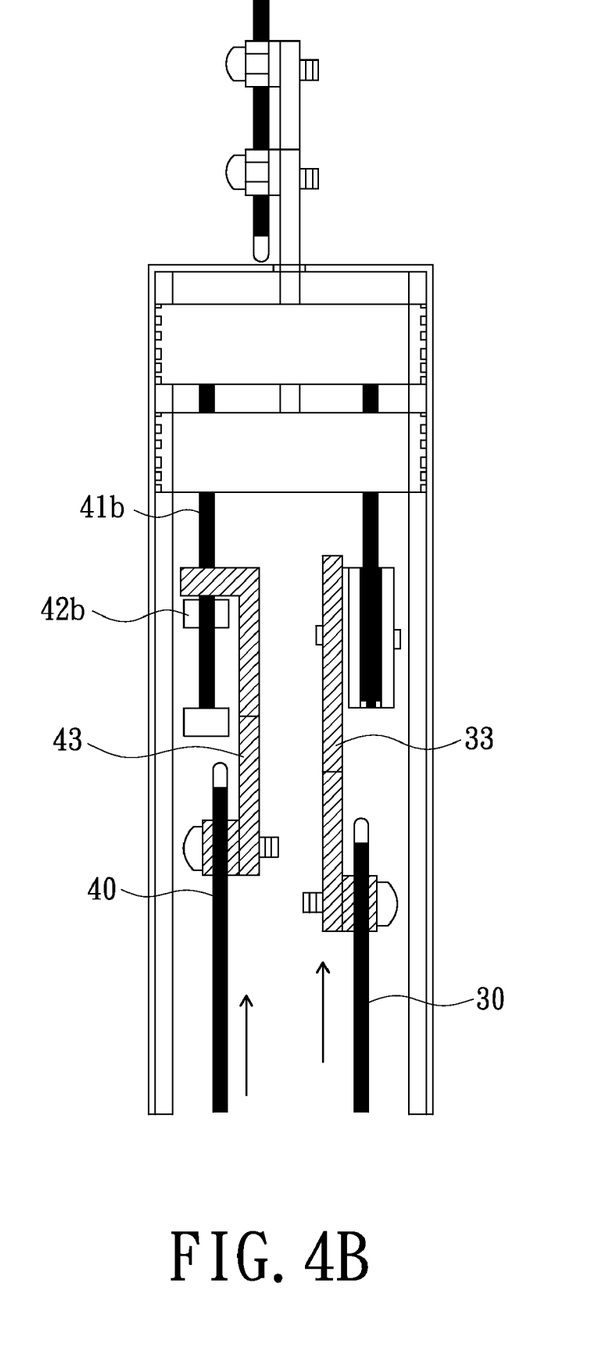
Figure 4C:
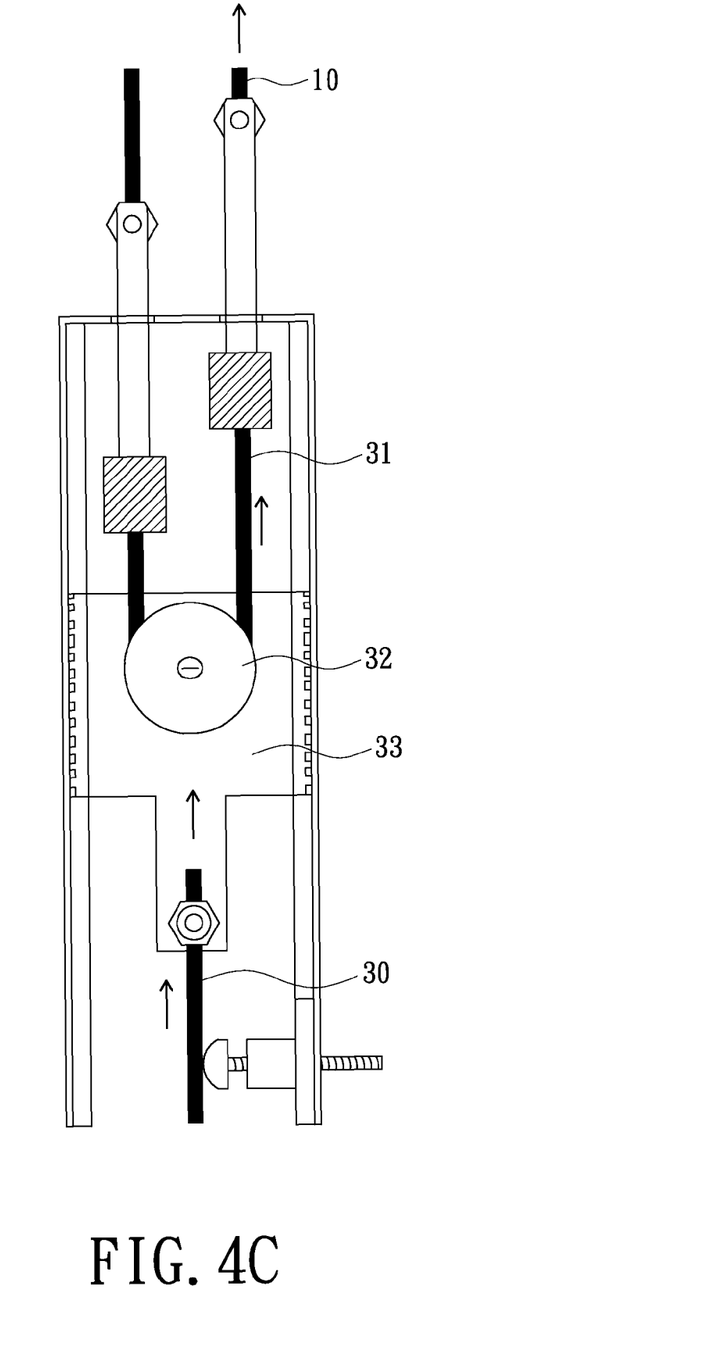

Referring to FIG. 4A~4C, when the driver use left hand only to apply the brake, the left brake cable 10 moves immediately to drive the left brake rod 12 and the left brake bar 13. The left brake bar 13 drives the front brake chain 31, the rear brake lines 41*b*and the rear brake knot 42*b*. The rear brake knot 42*b* drives the rear brake line tablet 43 and rear brake cable 40. The extent of movement of the rear brake cable 40 is the same as the extent of movement of the left brake cable 10. But the rear brake line 41*a* and the rear brake knot 42*a* do not move. At the same time, the front brake chain 31 moves to turn the front brake chain pulley 32 and to drive the front brake line tablet 33. The front brake line tablet 33 drives the front brake cable 30. However, the extent of movement of the front brake cable 30 is an half of the extent of movement of the left brake cable 10. This is so-called non-synchronous movement with the same phase.

Figure 5A:
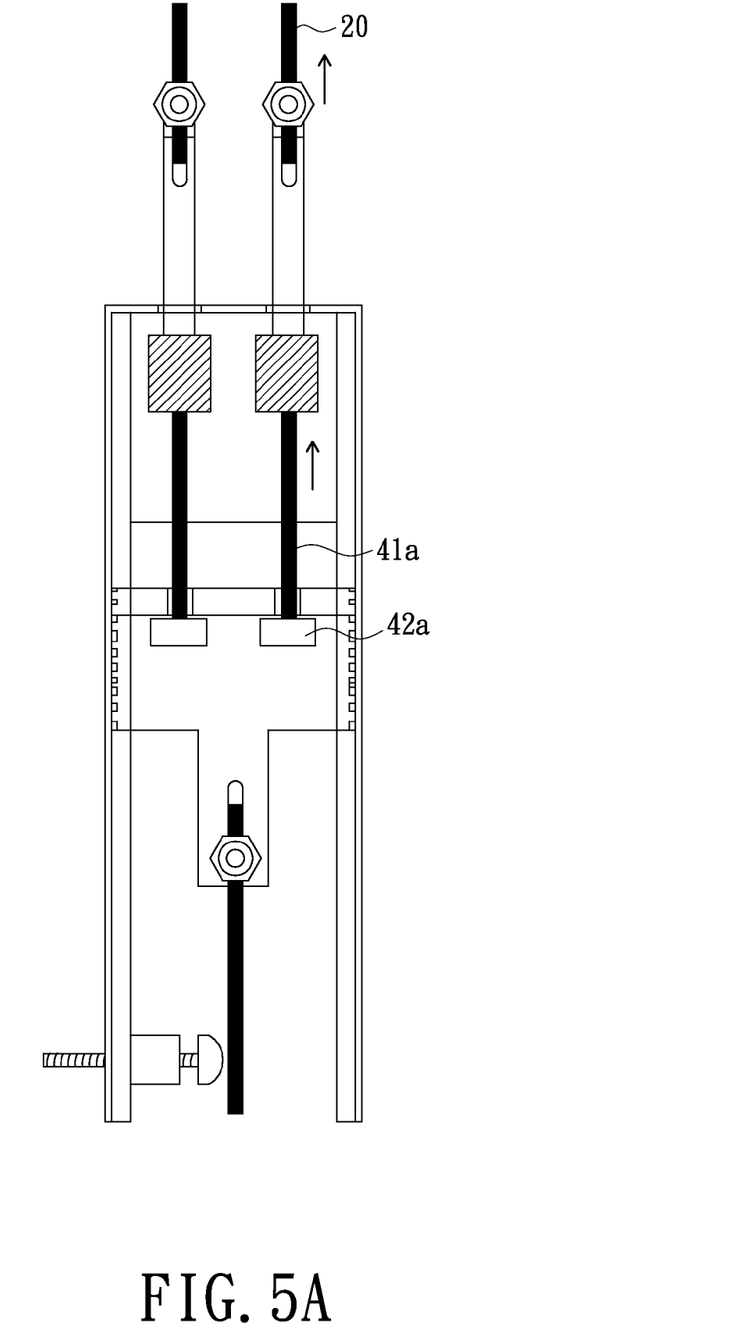
FIGS. 5A~5C are sectional views of the safe braking apparatus of the present invention in the first embodiment at left hand first and then right hand used stage, in which 5A is a front view, 5B is a side view, and 5C is a back view.
Figure 5B:
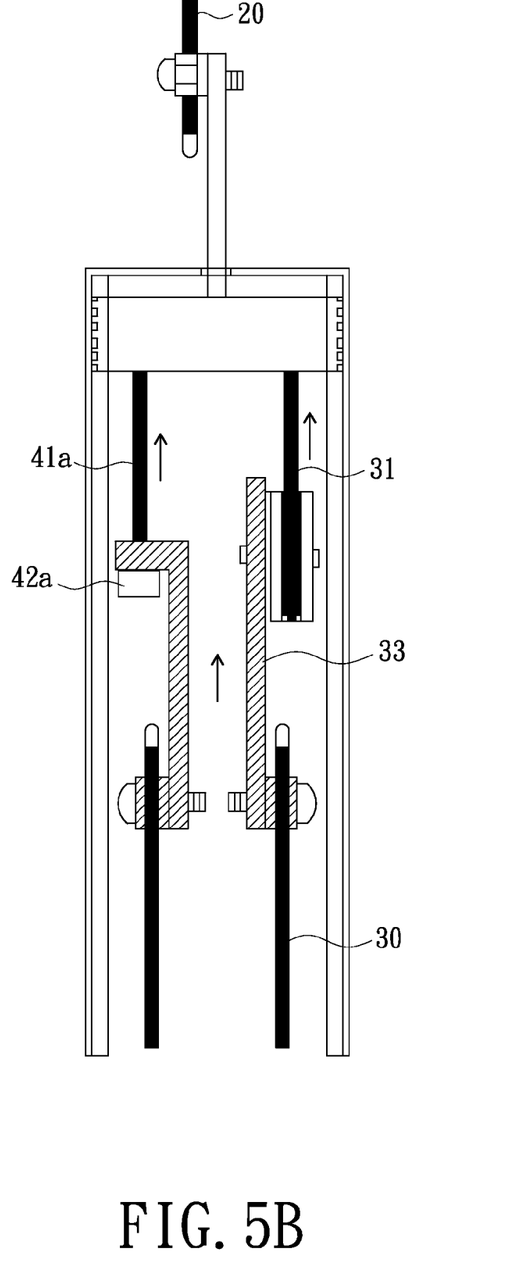
Figure 5C:
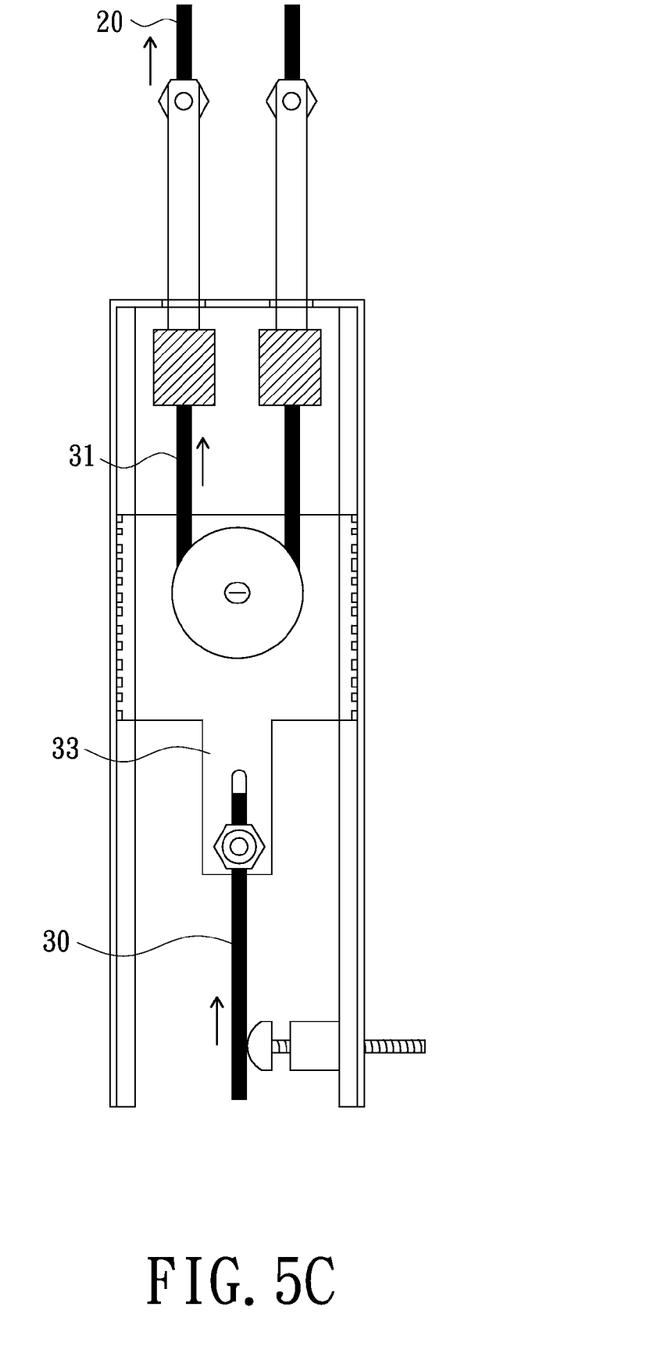

Referring to FIG. 5A~5C, after using the left hand, the driver then uses his right hand to apply the brake. The right brake cable 20 moves immediately to drive the right brake rod 22 and the right brake bar 23. The right brake bar 23 drives the front brake chain 31, the rear brake line 41*a* and the rear brake knot 42*a*. The front brake chain 31 moves to turn the front brake chain pulley 32 and to drive the front brake line tablet 33. The front brake line tablet 33 drives the front brake cable 30. The extent of movement of the front brake cable 30 is an half of the extent of movement of the right brake cable 20. However, because the rear brake knot 42*a* does not move and is detached from the rear brake line tablet 43 (FIG. 4A) at earlier stage, it can not drive the rear brake line tablet 43 at this stage. Therefore, the rear brake cable 40 will not be moved furthermore until the rear brake knot 42*a* touch the rear brake line tablet 43 again.

In above example, the driver uses his left hand first and then uses his right hand latter. The final result will be the same if he uses his right hand first.

If the driver uses both hands to apply the brake at the same time with different forces, the displacements of the left brake cable 10 and right brake cable 20 will be different. For example, the displacement of the left brake cable 10 is 1 cm, and the displacement of the right brake cable is 0.5 cm. Because the left brake cable 10 and right brake cable 20 drive the front cable 30 through the front brake chain pulley 32, so in theory, the displacement of the front brake cable is equivalent to (1+0.5)/2 cm, that is 0.75 cm. However, because the left brake cable 10 or the right brake cable 20 can drive the rear brake cable 40 directly through the rear brake knot 42*a* or 42*b*, the displacement of the rear brake cable 40 is equivalent to max (1, 0.5) cm. Between the left brake cable 10 and the right brake cable 20, the one with greater displacement decides the extent of displacement of the rear brake 40, that is 1 cm in this case.

If the driver uses both hands to apply the brake at the same time and produces the same displacements of the left brake cable 10 and right brake cable 20, the displacements of the left brake cable 10, right brake cable 20, the front brake cable 30, and rear brake cable 40 will all be the same.

From the implementation of the previous embodiment, the braking apparatus would provide a result that, the displacement of the rear brake cable 40 is equal to the greater displacement between the left brake cable 10 and right brake cable 20 and the displacement of the front brake cable 30 is equal to the average displacement of the left brake cable 10 and right brake cable 20. Therefore, the extent of displacement of the rear brake cable 40 must be greater than or equal to the extent of displacement of the front brake cable 30. That is the main goal of this invention.

Figure 6A:
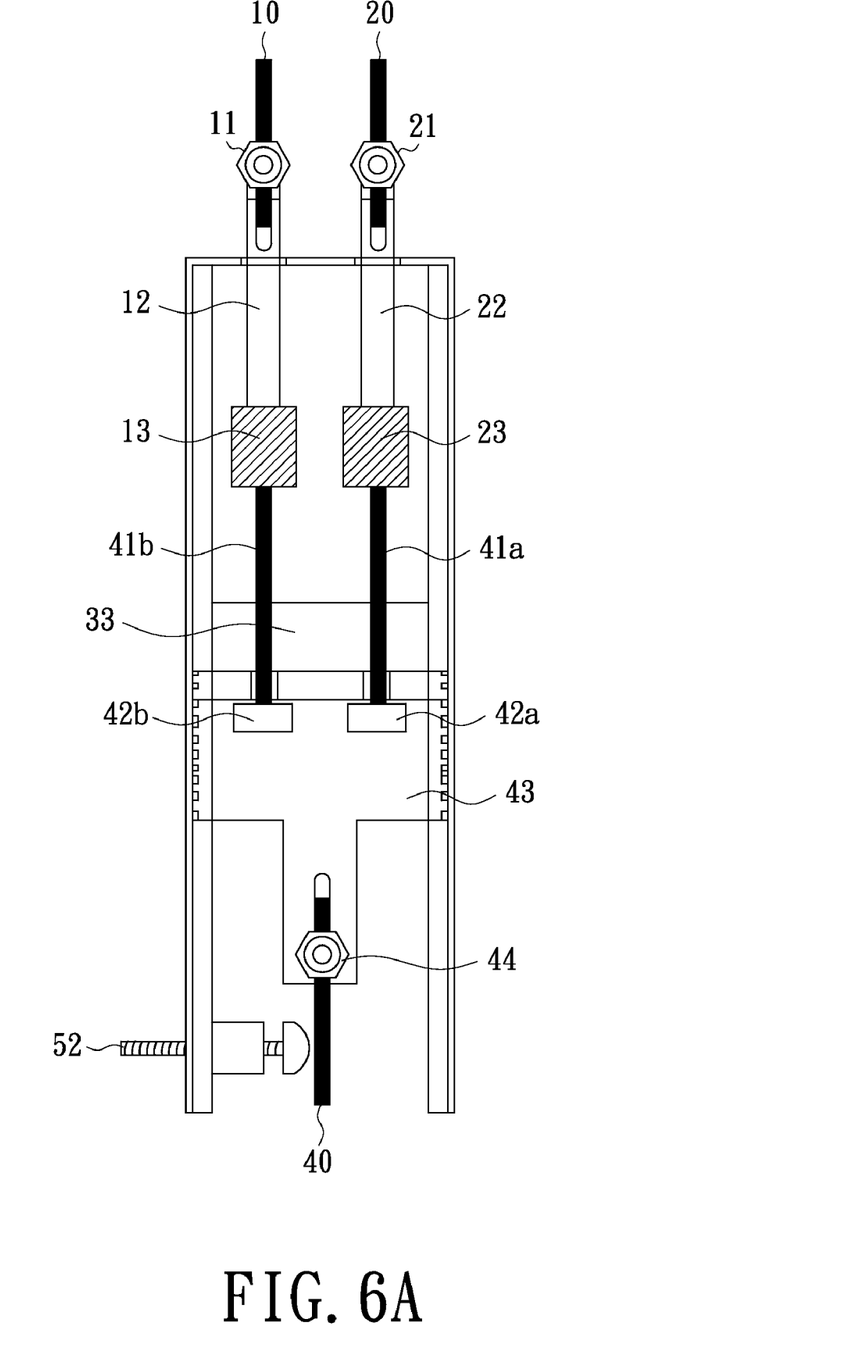
FIGS. 6A~6C are sectional views of the safe braking apparatus of the present invention in the second embodiment at resting stage, in which 6A is a front view, 6B is a side view, and 6C is a back view.
Figure 6B:
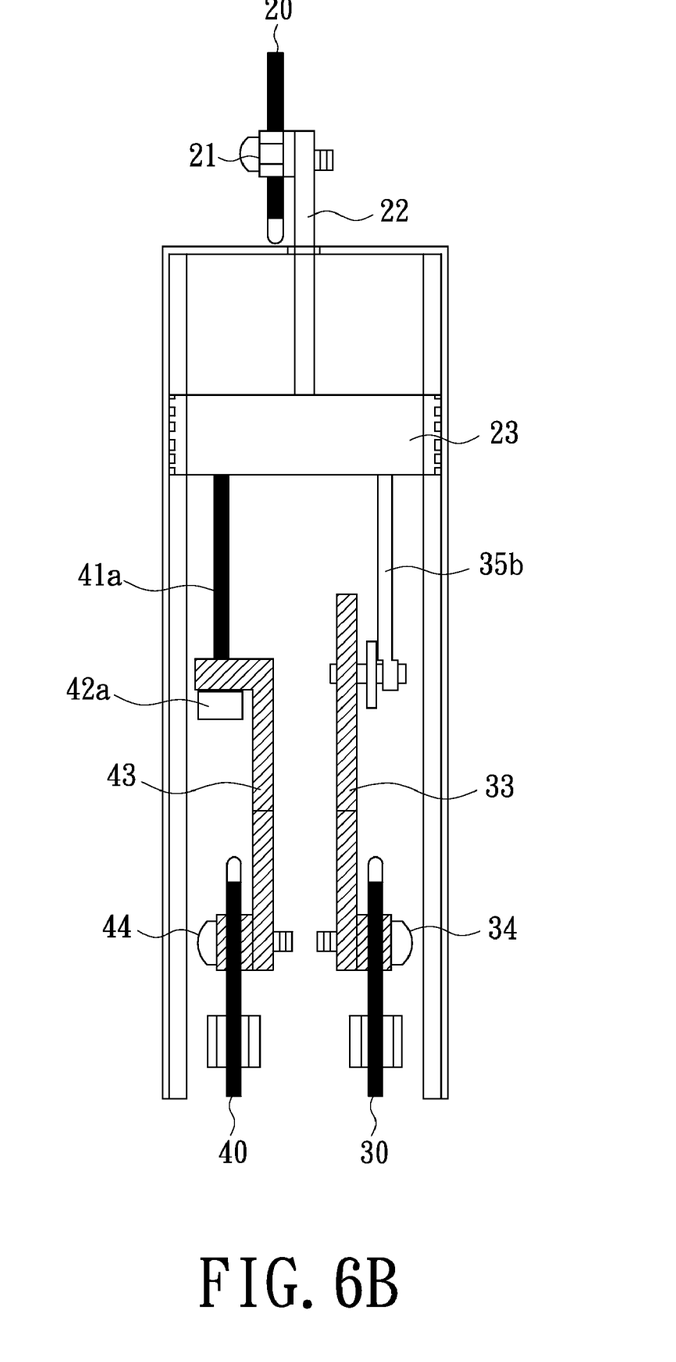
Figure 6C:
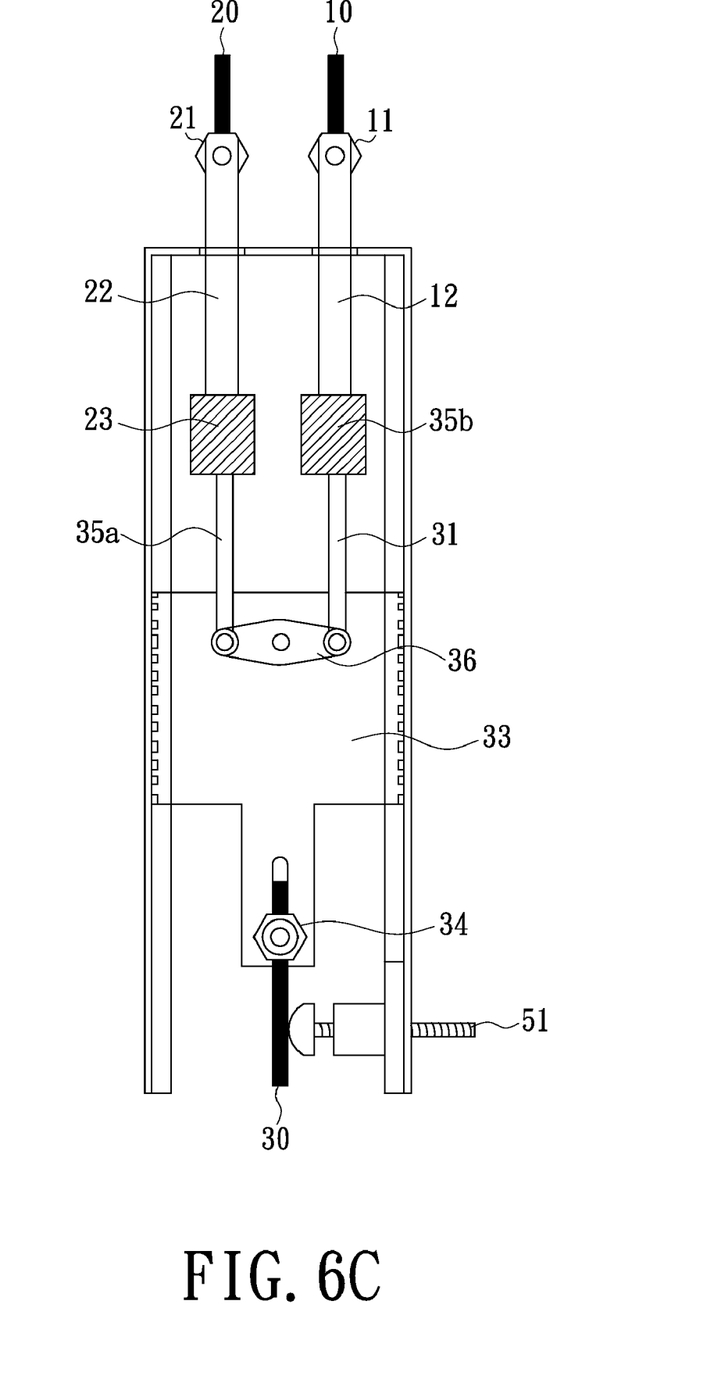

As shown in FIG. 6A~6C, there are some different between the first embodiment and the second embodiment. The front brake lever 36 replaces the front brake pulley chain 32. The front brake lines 35*a* and 35*b* replace the front brake chain 31. The front brake lever 36 is fixed on the front brake link tablet 33 and can be turned. The front brake lines 35*a* and 35*b* link to the front brake lever with relatable joints. The function of the front brake lever 36 is the same as the front brake pulley chain 32, which keeps the extent of displacement of the rear brake cable 40 greater than or equal to the extent of displacement of the front brake cable 30.

In practice, the brake cables may be loose and the linings of brake may be attrited. At that time, the user can adjust the front brake cable adjustment screw 51 or the real brake cable adjustment screw 52 to ensure the safety of the braking apparatus.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:
1. A safety brake device for two-wheel vehicle having a right brake lever with a right brake cable extending therefrom which is drawn towards the lever when the lever is actuated, a left brake lever having a left brake cable extending therefrom which is drawn towards the lever when the lever is actuated, a front brake having a front brake cable extending therefrom, the front brake being actuated when the front brake is drawn away from the brake, and a rear brake having a rear brake cable extending therefrom, the rear brake being actuated when the rear brake is drawn away from the brake, the device comprising:
   a housing supported to the two-wheel vehicle having said left and right brake cables and said front and rear brake cables communicating therewith;
   a right brake actuator movably supported in said housing, said right brake cable being connected to said right brake actuator, said right brake actuator being movable between a first position in which said right brake lever is not applied and a second position wherein said right brake cable is withdrawn;
   a left brake actuator movably supported in said housing, said left brake cable being connected to said left brake actuator, said left brake actuator being movable between a first position in which said left brake lever is not applied and a second position wherein said left brake cable is withdrawn;
   a front brake actuator movably supported in said housing, said front brake cable being connected to said front brake actuator, said front brake actuator being movable between a first position in which said front brake is not applied and a second position wherein said front brake cable is withdrawn to apply said front brake;
   a rear brake actuator movably supported in said housing, said rear brake cable being connected to said rear brake actuator, said rear brake actuator being movable between a first position in which said rear brake is not applied and a second position wherein said rear brake cable is withdrawn to apply said rear brake; and
   means for biasing the movement of said rear brake cable to said front brake cable whereby when applying said left brake lever at first, the displacement of said rear brake cable is the same as the displacement of said left brake cable and the displacement of said front brake cable is one half of said left brake cable, when applying said right lever later than said left lever, the displacement of said front brake cable is one half of said right brake cable but said rear brake cable is not moved, when applying said right brake lever at first, the displacement of said rear brake cable is the same as the displacement of said right brake cable and the displacement of said front brake cable is one half of said right brake cable, when applying said left lever later than said right lever, the displacement of said front brake cable is one half of said left brake cable but said rear brake cable is not moved, and when applying both said left brake lever and said right brake lever with the same extent, the displacement of said rear brake cable is the same as the displacement of said front brake cable.

2. The apparatus of claim 1, wherein said front brake actuator comprises:
   a pulley, a link tablet and a pulley cable;
   said pulley is set on said link tablet and pulled by said pulley cable that is connected to said left brake actuator and said right brake actuator.

3. The apparatus of claim 1, wherein said real brake actuator comprises:
   a link tablet that is connected to said left brake actuator and said right brake actuator by link cables.

4. The apparatus of claim 1, wherein said left brake actuator comprises:
   a left brake bar that connected to said rear brake actuator by said link cable and connected to said front brake actuator by said pulley cable.

5. The apparatus of claim 1, wherein said right brake actuator comprises:
   a right brake bar that connected to said rear brake actuator by said link cable and connected to said front brake actuator by said pulley cable.

6. A safe braking apparatus using in a two-wheel vehicle, comprising:
   a front brake unit that actuates a front brake of said two-wheel vehicle through front brake cable;
   a rear brake unit that actuates a rear brake of said two-wheel vehicle through rear brake cable;
   a left brake bar that drives the rear brake unit directly and drives the front brake unit through a pulley simultaneously; and
   a right brake bar that drives the rear brake unit directly and drives the front brake unit through said pulley simultaneously;
   wherein when said left brake bar and said right brake bar are actuated, the displacement of said rear brake cable is equal to the longer one between the displacement said left brake bar and the displacement said right brake bar, and the displacement of said front brake cable is equal to the average of the displacements of said right brake bar and said left brake bar.

7. The apparatus of claim 6, wherein said rear brake unit comprises:
   a link tablet that slidably moves to actuate the rear brake of said two-wheel vehicle;
   two holes on the link tablet, a cable with knot through one hole to connect said left brake bar and a cable with knot through the other hole to connect said right brake bar.

8. The apparatus of claim 6, wherein said front brake unit comprises:
   a link tablet that slidably moves to actuate the front brake of said two-wheel vehicle;
   a pulley cable that moves around said pulley and one end thereof is connected to said left brake bar and the other end thereof is connected to said right brake bar.

9. The apparatus of claim 6, wherein further comprises a holder;
   said left brake bar, right brake bar, front brake unit and rear brake unit can move in there smoothly.

10. A safety brake device for two-wheel vehicle having a right brake lever with a right brake cable extending therefrom which is drawn towards the lever when the lever is actuated, a left brake lever having a left brake cable extending therefrom which is drawn towards the lever when the lever is actuated, a front brake having a front brake cable extending therefrom, the front brake being actuated when the front brake is drawn away from the brake, and a rear brake having a rear brake cable extending therefrom, the rear brake being actuated when the rear brake is drawn away from the brake, the device comprising:
   a housing supported to the two-wheel vehicle having said left and right brake cables and said front and rear brake cables communicating therewith;
   a right brake actuator movably supported in said housing, said right brake cable being connected to said right brake actuator, said right brake actuator being movable between a first position in which said right brake lever is not applied and a second position wherein said right brake cable is withdrawn;

a left brake actuator movably supported in said housing, said left brake cable being connected to said left brake actuator, said left brake actuator being movable between a first position in which said left brake lever is not applied and a second position wherein said left brake cable is withdrawn;

a front brake actuator movably supported in said housing, said front brake cable being connected to said front brake actuator, said front brake actuator being movable between a first position in which said front brake is not applied and a second position wherein said front brake cable is withdrawn to apply said front brake;

a rear brake actuator movably supported in said housing, said rear brake cable being connected to said rear brake actuator, said rear brake actuator being movable between a first position in which said rear brake is not applied and a second position wherein said rear brake cable is withdrawn to apply said rear brake; and means for biasing the movement of said rear brake cable to said front brake cable whereby when applying said left brake lever and said right brake lever, the displacement of said rear brake cable is equal to the longer one between the displacement said left brake cable and the displacement said right brake cable, and the displacement of said front brake cable is equal to the average of the displacements of said right cable bar and said left brake cable.

11. The apparatus of claim 10, wherein said front brake actuator comprises:
a pulley, a link tablet and a pulley cable;
said pulley is set on said link tablet and pulled by said pulley cable that is connected to said left brake actuator and said right brake actuator.

12. The apparatus of claim 10, wherein said rear brake actuator means comprises:
a link tablet that is connected to said left brake actuator and said right brake actuator by link cables.

13. The apparatus of claim 10, wherein said left brake actuator comprises:
a left brake bar that connected to said rear brake actuator by said link cable and connected to said front brake actuator by said pulley cable.

14. The apparatus of claim 10, wherein said right front brake actuator comprises:
a right brake bar that connected to said rear brake actuator by said link cable and connected to said front brake actuator by said pulley cable.

* * * * *